No. 723,408. PATENTED MAR. 24, 1903.
W. ROBINSON.
BICYCLE.
APPLICATION FILED DEC. 17, 1902.
NO MODEL. 2 SHEETS—SHEET 1.
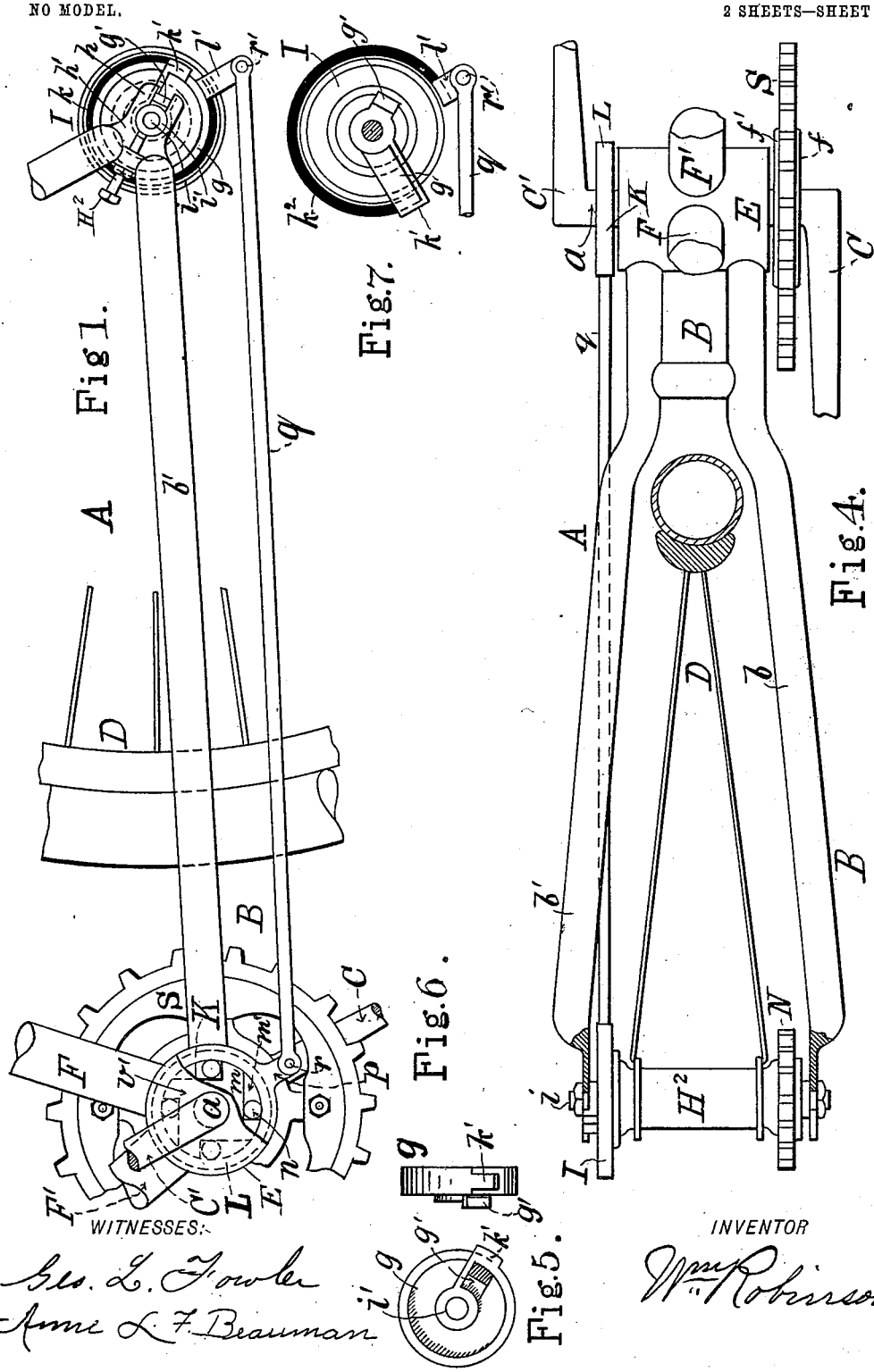
WITNESSES: Geo. L. Fowler
Anne L. F. Beauman
INVENTOR
Wm. Robinson No. 723,408. PATENTED MAR. 24, 1903.
W. ROBINSON.
BICYCLE.
APPLICATION FILED DEC. 17, 1902.
NO MODEL. 2 SHEETS—SHEET 2.
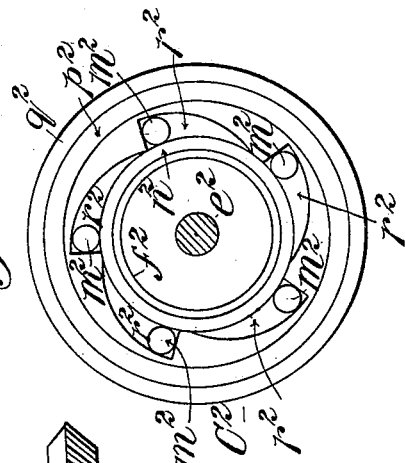
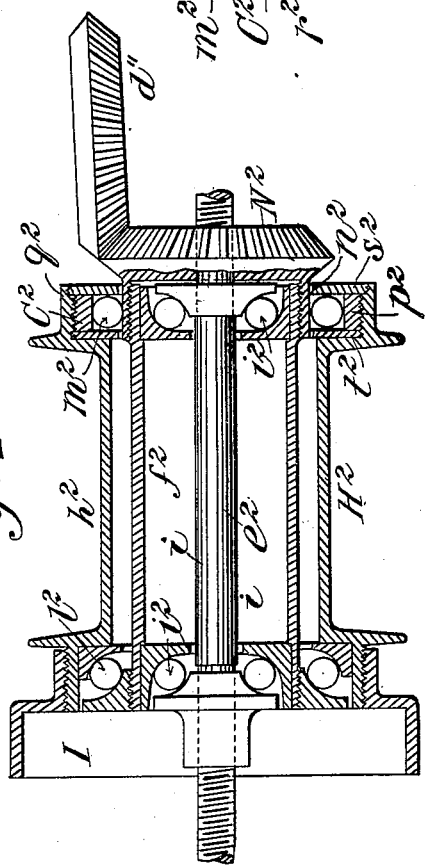

UNITED STATES PATENT OFFICE.

WILLIAM ROBINSON, OF BROOKLYN, NEW YORK.

BICYCLE.

SPECIFICATION forming part of Letters Patent No. 723,408, dated March 24, 1903.

Original application filed November 15, 1897, Serial No. 658,638. Divided and this application filed December 17, 1902. Serial No. 135,545. (No model.)

*To all whom it may concern:*

Be it known that I, WILLIAM ROBINSON, a citizen of the United States, residing at Brooklyn, in the county of Kings and State of New York, have invented a new and Improved Bicycle, of which the following is a specification.

My invention pertains to the driving and braking mechanism of bicycles and similar machines.

It embodies an automatic brake and coaster and embraces various details in the construction and arrangement of the driving and brake mechanism of the machine.

The nature of my invention will be clearly understood from the description which follows, reference being had to the accompanying drawings, which form a part of this specification, in which—

Figure 1 is a side view, partly in section, of a bicycle, illustrating a portion of my invention, showing especially the back-pedal braking mechanism. Fig. 2 is a view, chiefly in longitudinal section, illustrating the application of my invention to the driving-hub of a bevel-gear chainless bicycle; and Fig. 3 is a face view of the driving-clutch as applied thereto. Fig. 4 is a plan view of the essential features of a bicycle embodying the main features of my invention. Fig. 5 is a side view of the non-rotatable brake-supporting plate, and Fig. 6 is an edge view of the same. Fig. 7 shows an alternate form of the brake as applied to the rear hub.

A represents a bicycle having the frame B, provided with the cranks C C', connected by the crank-shaft $a$ and mounted in the crank-bracket E in any usual or suitable manner. The rear or driving wheel D, with its hub $H^2$, is also mounted in the frame B between the lower fork sides $b$ $b'$ in the usual manner.

The upper portions of the bicycle-frame and certain other portions are omitted for the purpose of permitting a clearer illustration of the working parts.

In the automatic brake mechanism I is a barrel or drum secured to the hub $H^2$ and revolving therewith. The non-rotatable fixture or plate $g$ is removably secured to the frame of the machine, being held rigidly in place by its projection $g'$ engaging the jaws $h$ of the rear forks $h'$ and by the wheel-axle $i'$ passing through the orifice $i'$ of said plate $g$. One end of the expanding brake-ring $k$, which is mounted on the fixed plate $g$, engages or abuts against the projection or shoulder $k'$ of said fixed plate $g$, while the opposite end of said expanding brake-ring is secured to or engaged by the lever $l'$. The brake-ring $k$, together with that portion of the fixed plate $g$ engaging or supporting said expanding brake-ring, is inclosed or overlapped by said brake-drum I, said expanding-ring being normally located in close proximity to the inner peripheral surface of said brake-drum I, as illustrated in Fig. 1.

The brake-clutch K has the periphery of its clutch center $m$ provided with grooves or recesses $m'$, gradually tapering or varying in depth from one end of said recesses to the other. This clutch center $m$ is mounted rigidly on the crank-shaft $a$ and is surrounded peripherally by the clutch-ring L, which is provided with the operating-lug $p$. Balls or rollers $n$ are inserted in the recesses $m'$ between the clutch center $m$ and its outer clutch-ring L. Side plates $v'$ inclose the balls $n$ in position and keep the clutch center $m$ and its clutch-ring L in proper vertical alinement. The lugs $l'$ of the brake and $p$ of the brake-clutch mechanism are coupled together by the connecting-rod $q$, which has its opposite ends pivotally or flexibly connected to said lugs, as shown at $r$ $r'$.

The driving and coasting mechanism of the hub $H^2$ is clearly illustrated in Fig. 2, in which $i$ represents the non-rotating supporting shaft or axle and $f^2$ a sleeve which is virtually an extension or elongation of the hub $n^2$ of the driving-gear $N^2$, mounted rotatably on two rows of balls $i^2$ $i^2$ on said supporting-axle $i$ and revolving freely and firmly thereon. The outer or wheel hub $h^2$ is supported rotatably on said sleeve $f^2$, being supported at one end on the row of free revolving balls $l^2$, as shown, and at the other end by the clutch-balls $m^2$.

The construction of the driving-clutch $C^2$, which is arranged to clutch the gear-sleeve $f^2$ and the outer hub $h^2$ detachably together, is clearly illustrated in Fig. 3, in which the hub $n^2$ of the gear $N^2$, secured rigidly to the sleeve $f^2$, forms a uniform peripheral bearing for the clutch-balls $m^2$. The outer ring $p^2$ is provided on its inner peripheral surface with tapering recesses $r^2$, deeper at one end than at the other, as shown. This ring $p^2$ is securely screwed or otherwise fastened into the end $q^2$ of the hub $h^2$, as shown. In the recesses $r^2$ are located the clutch-balls $m^2$, said balls being kept in proper rotative and clutching position by the side plates $s^2$ $t^2$. In the driving-clutch $C^2$ the recessed ring $p^2$ is secured to the hub $h^2$ in such a position that the narrower ends of the tapering recesses $r^2$ extend forward, so that when the inner sleeve $f^2$ is rotated forward by its driving-gear $N^2$ the clutch balls $m^2$ are carried forward to the narrower part of said recesses $r^2$, thus locking together the driver $f^2$ and the hub $h^2$, and thus driving said hub and its wheel forward. When, however, the forward rotation of said inner or driver sleeve $f^2$ is arrested, as by the stopping of the pedals, the momentum of the forward-moving wheel instantly causes the hub $h^2$ to overtake the clutch-balls $m^2$, bringing them into the widest part of the recesses $r^2$—that is, the clutch is released and the wheel coasts, carrying said clutch-balls $m^2$ with it around the now stationary driving-sleeve $f^2$. Inspection will show that in the braking-clutch K in forward driving the clutch center $m$, secured to the crank-shaft $a$, rotates freely within the clutch-ring L, carrying the clutch-balls $n$ around with said shaft without affecting said outer clutch-ring L or the brake, said clutch-balls $n$ being in the widest parts of said recesses $m'$.

It will be understood that in coasting the feet are held stationary on the pedals, which are also stationary with reference to the other rotative parts of the machine. Now assuming that the wheel is coasting and the pedals stationary, as described, in order to apply the brake the crank-shaft is given a positive backward rotative movement by carrying the pedals backward. This initial movement instantly wedges the balls or rollers $n$ between the clutch center $m$ and the clutch-ring L, thus locking the elements of the clutch K together. A further reverse movement of the crank-shaft rotates the outer clutch-ring L, with its lug $p$, in the same direction, thus drawing the rod $q$ forward, and thereby transmitting power from the clutch K, through said connecting-rod $q$, to the brake, expanding the brake-ring or device $k$, and thus producing a frictional braking contact between said expanding-ring $k$ and the inner surface of the brake-drum I. It is evident that in this way the brake may be applied gradually or suddenly with entire smoothness of operation and without any of the usual strain on the legs and system incident to the "kick" of back-pedaling, so called, when applied in controlling the wheel by dead back pressure without brakes.

It will be observed that my brake is applied independently of the momentum of the wheel and is as easily applied at the highest rate of speed attainable as at the slowest speed. Furthermore and one of the important points about this invention is that it is impossible to lose the pedals, and thus lose control of the wheel, under any circumstances. In coasting with the feet on the coasters or anywhere else off the pedals the pedals may be instantly picked up and the brake applied and the machine brought under immediate control no matter how great its speed at the instant.

It will be understood that the brake-drum I is secured to the outer or wheel hub $h^2$, as shown, as $h^2$ is the hub or sleeve upon which the wheel is built up.

That part of the brake system shown in immediate connection with the hub $H^2$ in Fig. 1 is intended to illustrate a convenient device which may be used in carrying out my invention; but I do not limit myself to this particular form of brake, but may use other forms—for instance, a band-brake, as illustrated in Fig. 7, in which a band braking-spring $k^2$ is arranged outside of the brake-drum I and controlled by the connecting-rod $q$.

Figs. 1 and 4 illustrate the application of my invention to chain-driven wheels, while Figs. 2 and 3 show its application to bevel-gear chainless bicycles. In the bevel-gear chainless bicycle it is absolutely necessary that the gears should have and retain a firm and perfectly central position in order that the gears may mesh uniformly. In order to accomplish this and to allow the hub to have a free coasting movement, it is necessary that the beveled driving-gear shall have a very long independent bearing. A suitable automatically-detachable independent bearing of the bevel-gear cannot be obtained on the outside of the driving-wheel hub since the spokes of the wheel are in the way. I therefore elongate the hub of the bevel-gear and mount it within the wheel-hub proper, as already specifically described in connection with Figs. 2 and 3. This construction substantially is absolutely necessary for the successful application of my invention to the driving-wheel hub of a bevel-gear chainless bicycle of usual construction.

I do not herein claim, broadly, a coasting and braking wheel-hub provided at one end with a driver and at the opposite end with a brake, means for clutching the driver and hub together for driving and releasing the same for coasting, and means for actuating said brake by back-pedaling, nor do I herein claim, broadly, in a coasting and braking hub a non-rotatable brake-shoe-supporting plate engaging the frame at one end of the hub and a driver at the opposite end of the hub, since these disclosures are made in my application filed October 8, 1897, Serial No. 654,532, and I herein reserve the right to claim the subject-matter of such disclosures in my said application.

Having thus described my invention, what

I claim as new, and desire to secure by Letters Patent, is—

1. In a bicycle, the combination of a driving-wheel provided with a hub consisting, essentially, of a supporting-shaft, a driving or gear sleeve supported rotatably thereon, an outer or wheel hub supported rotatably on said gear-sleeve and provided with a brake-drum, means for automatically clutching together said gear-sleeve and outer hub for driving the wheel and releasing the same for coasting, means for driving said wheel forward, brake mechanism applicable to said brake-drum for braking, a driving or crank shaft provided with a brake-actuating clutch, and means for connecting said clutch to the brake mechanism.

2. A coasting and braking mechanism consisting, essentially, of a supporting-shaft, an inner hub or gear-sleeve mounted rotatably thereon, an outer or wheel hub provided with a brake-drum and supported rotatably on said gear-sleeve, means for clutching together and releasing said gear-sleeve and outer hub, means for driving said wheel forward, mechanism arranged to coöperate with said brake-drum to control the speed of the wheel, and a brake-actuating clutch mounted upon the crank-shaft and arranged to operate said brake mechanism by the backward rotation of said crank-shaft.

WILLIAM ROBINSON.

Witnesses:
OGDEN W. RING,
GEORGE H. HALE.